United States Patent
Tomaini

[19]

[11] Patent Number: 6,145,272

[45] Date of Patent: Nov. 14, 2000

[54] INSULATION FASTENER DISK METHOD FOR FASTENING INSULATION

[76] Inventor: John C. Tomaini, 143 Buena Vista Rd., New City, N.Y. 10956

[21] Appl. No.: 09/289,816

[22] Filed: Apr. 12, 1999

[51] Int. Cl.[7] .............................. F04B 1/00; F16B 43/02
[52] U.S. Cl. ..................... 52/745.21; 52/512; 411/156; 411/544
[58] Field of Search ................... 411/155, 156, 411/368, 542, 544; 52/745.21, 512

[56] References Cited

U.S. PATENT DOCUMENTS

| | | | |
|---|---|---|---|
| 2,293,743 | 8/1942 | Miles et al. | 52/745.21 X |
| 3,628,584 | 12/1971 | Gutshall . | |
| 4,545,270 | 10/1985 | Dewey | 411/544 X |
| 5,407,313 | 4/1995 | Bruins et al. . | |
| 5,688,092 | 11/1997 | Olvera et al. | 52/745.21 X |

*Primary Examiner*—Neill Wilson
*Attorney, Agent, or Firm*—Brian L. Wamsley, Esq.

[57] ABSTRACT

A flexible disk for securely holding insulation to an air duct made from a resilient material, and having a convex upper surface and a diameter of from 1.5 inches to 4.0 inches. A washer for receiving a disk fastener is centrally positioned in the disk top, which is thicker than the top. A rim is located at the circumference of the top which has a planar bottom for contacting the insulation. When the disk is properly attached to an air duct by a fastener, it deforms to a concave configuration by which it resiliently exerts force on the underside surface of the disk and the rim which in turn presses downward on the insulation, securely holding the insulation in place without crushing the insulation.

8 Claims, 3 Drawing Sheets

INSULATION FASTENER DISK METHOD FOR FASTENING INSULATION

This patent is related to U.S. patent application Ser. No. 08/558,711 filed Nov. 16, 1995, now abandoned.

BACKGROUND OF THE INVENTION

The present invention relates to an apparatus and a method for fastening and holding insulation. In particular, the apparatus and method relate to fastening insulation around air ducts commonly used for heating and air conditioning. The apparatus comprises a flexible disk of relatively large surface area which, when attached by a fastener, flexes below the plane of the insulation and therefore applies force and tension to the insulation without reducing the insulation value of the insulation.

Very often wires are used for encircling, and thereby attaching, insulation to metal duct work in, for instance, air conditioning and heating applications. Such means for securing insulation to the metal duct work often results in "bellying" of the insulation or in some way not allowing the insulation to come into full contact with the duct work, reducing the efficiency of the insulation, and also enabling the insulation to completely become disattached from the ducts. This is particularly troublesome in air conditioning and heating applications because the insulation is commonly applied in rooms and other structural areas that are not meant to be heated or air conditioned. This either causes condensation, which destroys insulation value and damages walls and floors, or corrosion of metals including the duct work itself. Further, such areas tend to be inacessible once the duct work is installed, rendering re-fastening of the insulation extremely difficult.

In many cases duct tape is used to hold the insulation to the sheet metal duct work. Even more so than wire, tape has a tendency to loosen and the insulation is thereby separated from the duct causing the condensation and corrosion problems mentioned above.

Numerous innovations for fasteners, some for insulation, have been known in the art. For example, in the fields of plaster repair or roofing, various screw-washer combinations have been suggested. Even though these innovations may be suitable for the specific individualistic purposes to which they are designed, they differ from the present invention. The complexity of such devices and/or the inapplicability of such devices to accomplish the fastening of insulation to metal duct work makes the use of such devices incapable of solving the problems of insulation-to-duct-work attachment. Moreover, the use of the flexible disk of this invention for attaching insulation to air ducts is heretofore unknown in the prior art.

Spring-type washers, referred to as dished or conical washers, have been employed to secure screwheads and nuts against loosening, such as in U.S. Pat. No. 3,628,584 to Gutshall. Washers of this type are inapplicable to insulation uses because their diameter and surface area is too small, they lack the necessary flexibility and require substantial flattening force which would crush the insulation and destroy the insulation properties. Similarly, resilient pressure plates for attaching roofing nails and holding shingles, as in U.S. Pat. No. 5,407,313 to Bruins et al., have significantly smaller diameters than the present invention and require substantial force to flex them in order to hold the shingle. Each of these qualities, particularly in combination, are undesirable in holding air conditioning type insulation.

It is therefore an object of the present invention to provide an improved means for fastening insulation to an air conditioning or heating duct. It is a further object of the invention to provide a fastener having an area large enough to apply force in holding the insulation without distortion of the insulation upon fastening, and having the proper amount of flexibility to hold the insulation without crushing it and destroying the insulation properties.

SUMMARY OF THE INVENTION

The present invention relates to a flexible, plastic disk having an extended diameter, and having a central circular opening for accommodating a fastening device, such as a galvanized metal screw.

In accordance with the present invention, the disk is molded from plastic material in a convex upper surface configuration. The disk has a disk top and a disk washer centrally positioned in the disk top and formed at an integral part of the disk. An opening is centrally located in the disk washer for receiving a fastening apparatus, such as a screw. The disk washer has a thickness sufficient to support the screw head which also allows the use of power tools to turn the screw without burning through the thinner dimension of the disk. The disk extends radially in all directions from its center, sloping downward at an angle of about 10°, forming a disk diameter of from about 1½" to about 4". The thickness of the disk body is about 0.06". An outer, vertical rim is located at the disk circumference providing an edge for contacting the insulation and holding it in place.

The rim edge can also contain serrations for preventing the disk from turning as the fastening screw is tightened. The disk has an overall height of about 0.25" measured from the bottom of the vertical rim to the top of the disk washer.

The design and dimensions of the disk allow for pressure to be uniformly applied to hold the insulation in place. In conjunction with the disk's thickness dimensions, the disk is designed to flex downward when the screw is tightened to a point where the bottom of the disk washer extends below the plane formed by the bottom of the disk rim. In this position of deformity, the disk rim provides enough pressure to hold the insulation without crushing it. Further, when the disk is properly applied it becomes deformed to the extent that the upper surface becomes concave, allowing the full surface area of the underside of the disk to come into contact with the insulation. Thus, this surface area supplements the holding force provided by the disk rim and distributes the force to a large surface area of the insulation.

BRIEF DESCRIPTION OF THE DRAWINGS

The above objects and advantages of the invention will become manifest to one skilled in the art from considering the following detailed description of an embodiment of the invention in light of the accompanying drawings, in which.

DETAILED DESCRIPTION OF THE INVENTION

Figure 1:
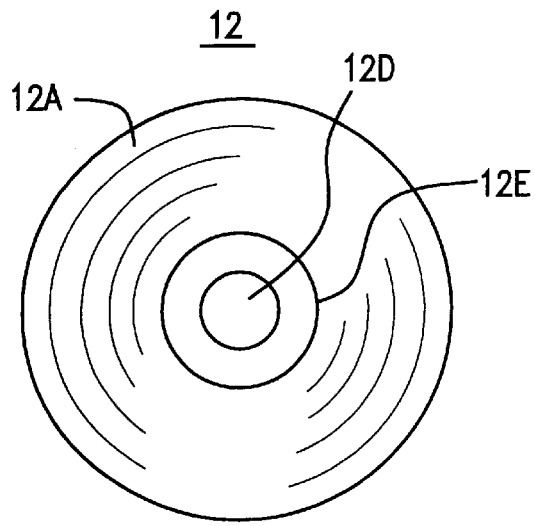
FIG 1 is a perspective view of the fastener disk in accordance with the present invention.

Turning now to the drawings, there is illustrated in FIG. 1 a top view of the insulation fastener disk 12 having a disk top 12A, a disk washer 12E and a disk opening 12D in the center position of disk washer 12E. Disk washer 12E is positioned in the center of disk top 12A and is an integral part thereof. Disk washer 12E has a disk opening 12D in its center for receiving the shaft of a disk fastening means 14 (see FIG. 4A), which preferably is in the form of a sheet metal screw. The washer 12E also may have a thickness greater than that of disk top 12A (not shown), the added thickness functioning as a reinforcement of the disk top 12A to support the fastener 14 and prevent failure, or burn-through, of disk top 12A when fastener 14 is tightened by turning, often by using a high-speed drill. In another embodiment of the invention, fastener 14 can be pre-installed in the disk opening 12D for efficiency and speed of applying multiple fasteners. Disk washer 12E is also con-figured to be slightly wider that the head of the fastener 14A, and the opening is sufficient to allow insertion of the fastener shaft 14B.

The insulation fastener disk of the invention has a convex surface 13 configuration, as best shown in FIGS. 2A, 2B, 3A, 3B and 4A. The disk top 12A extends out and downward in a radial direction from disk opening 12D at an angle of about 10° (see FIG. 3B). The underside of disk top 12A is thus concave. The convex surface 13 of disk top 12A is angled at a progressively increasing amount in the radial direction to produce a stiffness gradient that removes con-centrations of deflections. A rim 12C is located at the circumference of disk top 12A, which extends downward in a vertical direction from the disk top 12A. Rim 12C has a generally planar underside 12B for contacting the insulation, and functions to allow compressibility of the insulation 16 when fastener 14 is tightened to the air duct 18.

Figure 2A:
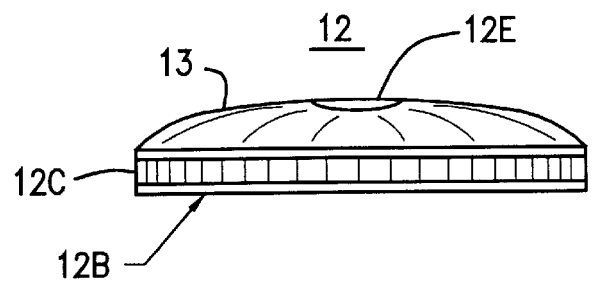
FIG. 2A is a side view of an embodiment of the fastener disk.
Figure 2B:
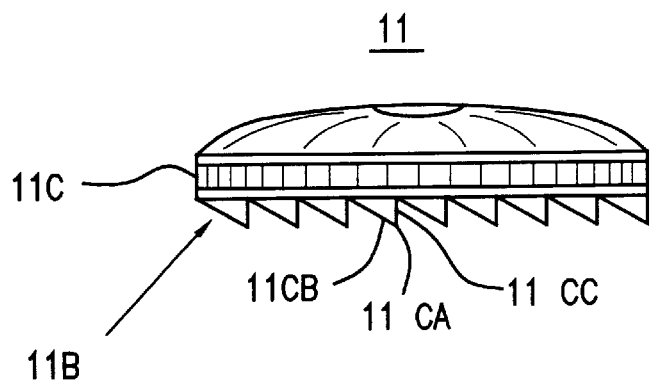
FIG. 2B is a side view of a further embodiment of the fastener disk.
Figure 3A:
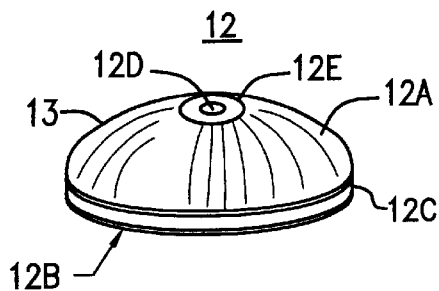
FIG. 3A is a further perspective view of the fastener disk exhibiting its convexity and the disk washer.

FIG. 2B illustrates a side view of another embodiment of the insulation fastener disk 11 according to the invention. In this embodiment, disk rim 11C has a plurality of rim teeth 11B configured to allow easy clockwise rotation of disk 11 upon clockwise tightening of fastener 14 with minimum damage, tear or deformation to the insulation 16, and also prevents counter clockwise rotation of disk 11. This permits fastener 14 to be easily removed for storage purposes. Each rim tooth 11B comprises a tooth point 11CA, a tooth left angle 11CB and a tooth right perpendicular 11CC. The tooth left angle 11CB is configured smaller to the disk rim 11C on a left end and larger to the disk rim 11C on a right end which terminates the tooth right perpendicular 11CC. The configu-ration of the tooth left angle 12CB and the tooth right perpendicular 11CC allow the tooth point 11CA to slipably rotate against the insulation 16 in a clockwise rotating direction and oppositely allows the tooth point 11CA to grip the insulation 16 in a counter clockwise rotating direction.

Figure 4A:
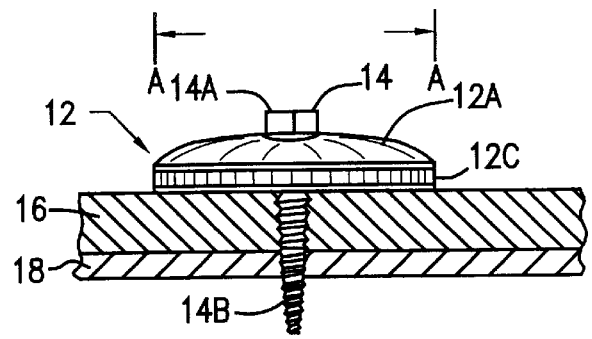
FIG. 4A is a side partial cross-sectional view of the fastener disk with attachment means inserted through the insulation and into the sheet metal of an air duct.

FIG. 4A is a side partial cross-sectional view of insulation fastener disk 12 with disk fastener 14 inserted through insulation 16 and into air duct 18. Disk top 12A is depicted as being slightly depressed with relation to the curvature shown in FIG. 3A due to the tightening of fastener 14 into the air duct 18, which is usually constructed from metal. At this stage, the insulation 16 is slightly compressed due to the pressure exerted by rim 12C as the fastener 14 is tightened.

When fastener 14 is tightened to its optimal extent, disk top 12A loses its convexity and becomes flattened to the point of becoming slightly concave, as illustrated in FIG. 12B. When this occurs, disk washer 12E is pulled toward the air duct to the degree that disk washer 12E becomes closer to the duct than the planar surface 12B of disk rim 12C. Thus, washer 12E, in the preferred embodiment, becomes lower than the plane of rim 12C as the disk 12 becomes compressed as fastener 14 is tightened, and the entire under-surface of disk 12 contacts the insulation and holds it in place. The tension thus produced in disk 12 is ideal for providing force against the insulation 16 in a manner that is spread through sufficient surface area of the insulation, to firmly hold the insulation in place while causing only minimal compression of the insu-lation itself. This property of insulation fastener disk 12 is a function of the disk's size as it relates to diameter and circumference, and the material from which the disk is made and the thickness of that material.

Figure 3B:
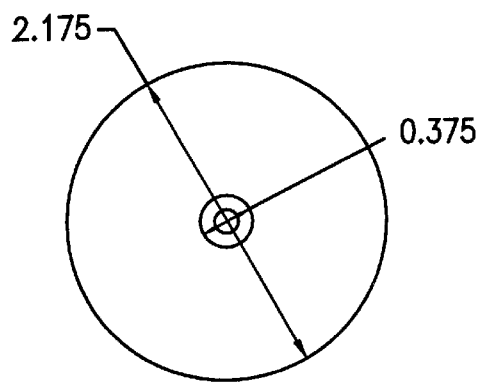
FIG. 3B is a cross-sectional view and top view of the fastener disk showing preferred disk dimensions.
Figure 3B:
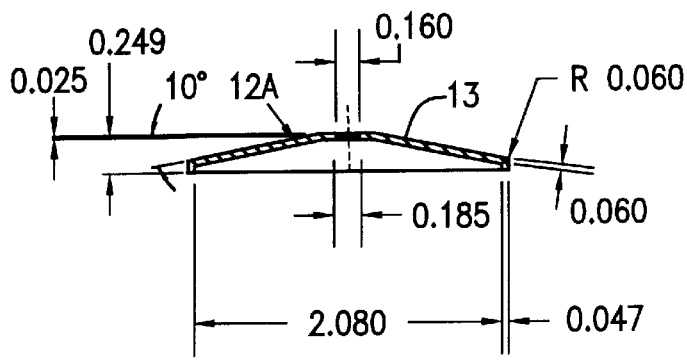
Figure 4B:
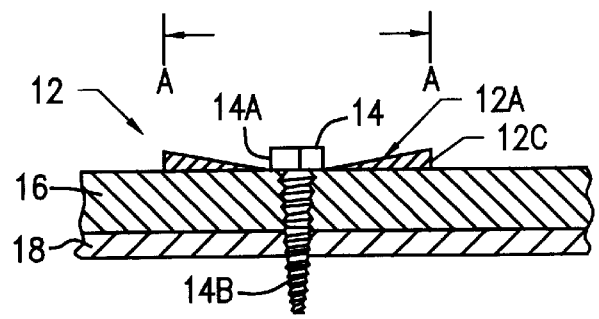
FIG. 4B is a further view of FIG. 4A along the axis A—A, illustrating the fastener disk at full flexion.

Accordingly, the disk of this invention is preferably manufactured from flexible materials such as plastic, plastic composite, rubber, rubber composite, metal and metal alloy. Poly propylene is preferred. The ideal disk dimensions are depicted in FIG. 3B. Altough disks having diameters from about 1.5 in. to about 4.0 in. are contemplated, the preferred embodiment of the invention has a diameter of about 2.175 in. and a circumference, therefore, of 6.833 in. This corre-sponds to an overall area of the disk of about 3.7154 in.$^2$. This surface area allows the force exerted by the disk to be distributed evenly over a relatively large area of insulation, and also dissipates the tension created in the disk when the fastener screw is tightened. The result of this uniform distribution of force is that the insulation is held securely to the air duct over a broad area, without causing wrinkling or undue compression of the insulation. When multiple fas-tener disks are employed, large sections of insulation are thus ideally attached to the air duct. Of course, the fastener disk can be of different diameters, but it has been found that a disk having a diameter of about 1.3 in. or less causes undue compression of the insulation and does not distribute the holding force over large enough an area. A practical upper limit of the disk's diameter is about 4.0 in. As also shown if FIG. 3B, the overall height of the disk is about 0.25 in. for the preferred embodiment material of polypropylene, and having a thickness of about 0.04 inches to about 0.06 in. Variations in these dimensions are contemplated in this invention and would depend generally on the choice of the disk material.

The fastener 14 is preferably made from a strong mag-netic adherable material, such as steel, stainless steel and/or galvanized steel such that a socket utilized in a power tool can be magnetized, thereby holding the fastener 14 and the disk 12 thereto. This allows the user to only utilize one hand to fasten the disk and the other free hand to hold the insulation in place during fastening of the fastener disk to the air duct. The fastener 14 can be selected from a group of configurations consisting of self-tapping screws, standard screws, self-drilling screws, and ring nails. Preferably, the fastener 14 is a self-drilling screw which is capable of drilling itself through the air duct 18.

Figure 5:
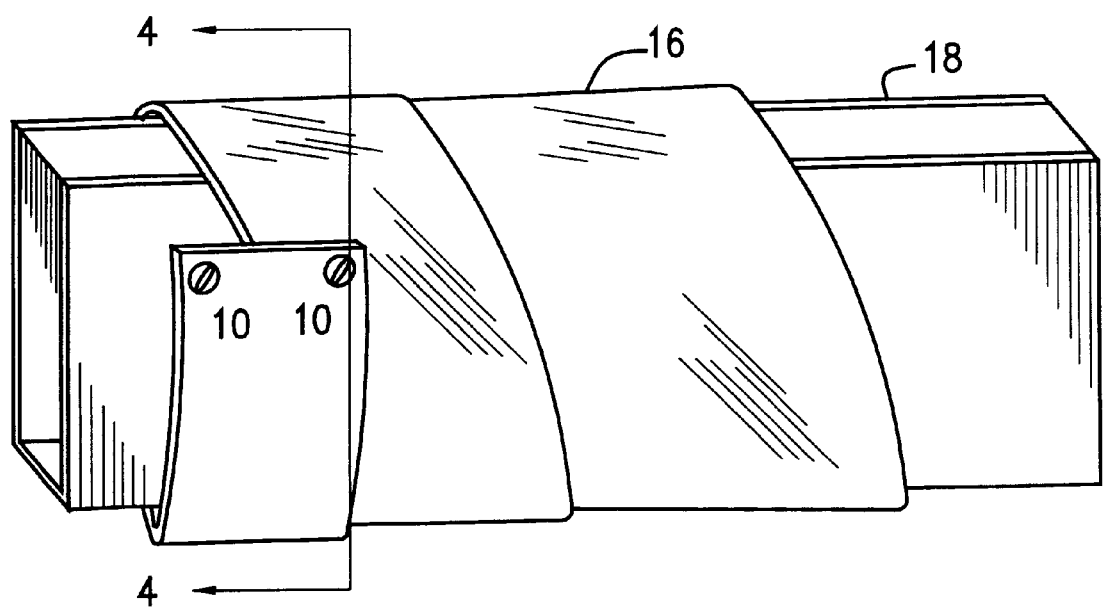
FIG. 5 is a perspective view of insulation wrapped around an air duct having a plurality of fastener disks securely holding the insulation to the air duct.

Lastly, referring to FIG. 5 which is a perspective view of insulation 16 wrapped around an air duct 18 having a plurality of insulation fastener disks 12 holding the insula-tion 16 to the air duct 18. Although the drawing only shows a few fastener disks fastening the distal end of the insulation 16, numerous other disks can be utilized throughout the insulation to prevent loosening or "bellying" of the insula-tion.

While the present invention has been explained in relation to its preferred embodiment, it is to be understood that various modifications thereof will be apparent to those skilled in the art upon reading this specification. The invention disclosed herein is therefore intended to cover all such modifications that fall within the scope of the appended claims.

What is claimed is:

1. A method of attaching insulation to an air duct, comprising;
    fastening a flexible disk to said air duct by means of a fastener, wherein said flexible disk comprises;
    a disk top made from a resilient material, said disk top having a convex upper surface and a concave lower surface, and having a diameter of from about 1.5 inches to about 4.0 inches,
    a disk washer portion formed in the disk top and centrally positioned in the disk top, said disk washer having a first planar bottom,
    a disk opening centrally positioned in the disk top and through the disk top, said disk opening being configured for receiving a disk fastener,
    a disk rim peripherally located at the circumference of the disk top, said disk rim being positioned substantially perpendicular to said disk top and said disk rim comprising a second planar bottom for contacting the insulation when the disk is in the proper fastening position,
    fastening said disk to said air duct by a fastener until the disk resiliently exerts force on the disk rim which in turn presses downward on the insulation, securely holding the insulation in place.

2. The method according to claim 1, further comprising fastening said disk with said fastener until the first planar bottom of said disk washer becomes spaced below the second planar bottom of said disk rim.

3. The method of claim 1, further comprising the step of tightening the fastener and causing the disk to deform to the extent that the lower surface of the disk contacts the insulation and applies a holding force to the insulation.

4. The method of claim 1, further comprising fastening the insulation using a plurality of said flexible disks.

5. The method according to claim 1, wherein said flexible disk is manufactured using material selected from the group consisting of plastic, plastic composites, nylon, polypropylene, rubber, rubber composites, metal and metal alloys.

6. The method according to claim 5, wherein the disk is manufactured using polypropylene.

7. The method according to claim 1, wherein the disk top has a thickness of from about 0.04 inches to about 0.06 inches.

8. The method according to claim 1, wherein the disk top has a height of about 0.25 inches.

* * * * *